D. W. LOOKER.
POST HOLE AUGER.
APPLICATION FILED OCT. 10, 1908.
946,060.
Patented Jan. 11, 1910.
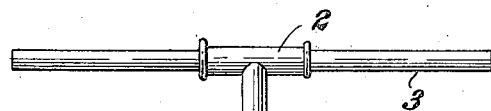
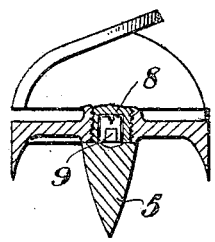
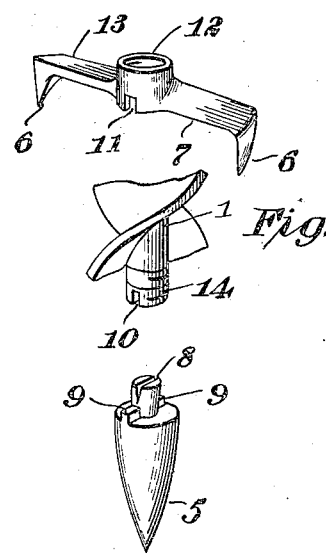
Inventor
D. W. Looker,

UNITED STATES PATENT OFFICE.

DAVID W. LOOKER, OF MARYVILLE, MISSOURI.

POST-HOLE AUGER.

946,060. Specification of Letters Patent. Patented Jan. 11, 1910.

Application filed October 10, 1908. Serial No. 457,183.

*To all whom it may concern:*

Be it known that I, DAVID W. LOOKER, citizen of the United States, residing at Maryville, in the county of Nodaway and State of Missouri, have invented certain new and useful Improvements in Post-Hole Augers, of which the following is a specification.

The present invention provides an implement for making openings in the earth to receive posts, poles or the like, the purpose being to devise a tool which will enable the hole or opening to be quickly formed and a minimum amount of earth being removed so that the pole or post may slip into position when elevated and be made secure by tamping the earth around the base or lower portion.

The implement comprises a stem having a handle at the operating end and provided at the penetrating end with a centering point and two sets of cutters, the one corresponding to the bore and the other adapted to remove the earth between the point and the circumscribing cutters in much the same fashion as an auger. The stem is provided with a spiral flight for removing the cuttings, thereby clearing the opening and preventing binding of the implement.

For a full understanding of the invention and the merits thereof and also to acquire a knowledge of the details of construction and the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which:

Figure 1 is an elevation of an implement embodying the invention. Fig. 2 is a sectional view of the penetrating end of the implement. Fig. 3 is a perspective view of the centering point, cutter and lower end of the stem.

Corresponding and like parts are referred to in the following description and indicated in all the views of the drawings by the same reference characters.

The tool or implement consists of a stem 1 which may be hollow or solid and is provided at its operating end with a cross head 2 in which is received a handle 3 for operating the tool when boring an opening or hole in the earth to receive the base portion of a pole or post. The opposite end portion of the stem has a spiral flight 4 which serves to remove the cuttings in the well known manner. The penetrating end of the implement is supplied with a centering point 5, circumscribing cutters 6 and horizontal cutters 7 for removing the earth between the point 5 and the cutters 6. These several parts may be constructed in any desired way, but it is preferred to have the centering point and the cutters made detachable, thereby admitting of their replacement when worn or displaced, as also to provide for sharpening the cutters to maintain them in prime condition.

In Figs. 2 and 3, the centering point 5 is shown provided with a shank 8 which is split to provide portions which are adapted to spring outward and make positive engagement with the inner walls of the lower portion of the stem 1 so as to hold the centering point in place under ordinary condition and use of the implement. Lugs 9 are provided at opposite sides of the base of the shank 8 and at the upper end of the centering point 5, said lugs as well as the shank 8, being an integral part of the centering point. The lugs 9 enter notches 10 in opposite sides of the stem 1 and prevent turning of the point therein. They also enter notches 11 in opposite sides of the hub 12 of the cutter, thereby locking the same upon the stem and preventing turning of the cutter thereon.

The cutter comprises a hub 12 and a bar 13, the latter having the cutters 6 at its ends and the horizontal cutters 7 intermediate of the hub 12 and cutter 6. The lower end portion of the stem 1 is threaded for a short distance, as indicated at 14, and the hub 12 is internally threaded to match the thread 14. After the cutter head is screwed home upon the lower end of the stem 1, its notches 11 will register with the notches 10 and the bar 13 will merge into the lower end of the spiral flight 4, so that the cuttings removed by the cutters 7 will pass freely upon the flight 4 and thence upward upon the same to clear the opening or hole being formed. After the cutter head has been placed in position, the centering point 5 is slipped into place in the lower end of the stem, the lugs 9 entering the notches 10 and 11 and preventing both rotation of the point and cutter head independently of each other and the stem and causing all to rotate as one part in the operation of the implement.

Having thus described the invention, what is claimed as new is:

1. The combination with a stem exteriorly screw-threaded at its lower end formed with an axial socket at its lower end and having a spiral flight extending along its length, of a detachable cutter head having a central hub screw-threaded for engagement with the stem, said hub being radially slotted on its under face, and a detachable centering point having a central shank and radially extending ribs adapted to engage with the notches in the cutter head hub.

2. In an implement of the character described, the combination with a stem exteriorly screw-threaded at its lower end and there formed with an axial socket, said stem being provided with a spiral flight extending along its length, of a detachable cutter head having a central hub screw-threaded for engagement with the stem and radially slotted on its under face, and a detachable centering point having a resilient split shank, the upper end of the centering point in the space surrounding the shank being formed with radial ribs adapted to engage with the notches in said hub.

In testimony whereof I affix my signature in presence of two witnesses.

DAVID ✕ W. LOOKER. [L. S.]
his mark

Witnesses:
T. T. HALLOWELL,
EDWARD OTIS.